US010266700B2

(12) United States Patent
Bichler et al.

(10) Patent No.: US 10,266,700 B2
(45) Date of Patent: Apr. 23, 2019

(54) RAPIDLY SUSPENDABLE PULVERULENT COMPOSITION

(71) Applicant: BASF SE, Ludwigshafen (DE)

(72) Inventors: Manfred Bichler, Engelsberg (DE); Michael Schinabeck, Altenmarkt (DE); Torben Gädt, Traunstein (DE); Oliver Mazanec, Rosenheim (DE)

(73) Assignee: BASF SE, Ludwigshafen (DE)

( * ) Notice: Subject to any disclaimer, the term of this patent is extended or adjusted under 35 U.S.C. 154(b) by 263 days.

(21) Appl. No.: 14/762,274

(22) PCT Filed: Mar. 24, 2014

(86) PCT No.: PCT/EP2014/055782
§ 371 (c)(1),
(2) Date: Jul. 21, 2015

(87) PCT Pub. No.: WO2014/154601
PCT Pub. Date: Oct. 2, 2014

(65) Prior Publication Data
US 2016/0002472 A1    Jan. 7, 2016

(30) Foreign Application Priority Data
Mar. 26, 2013    (EP) .................................... 13161133

(51) Int. Cl.
| | | |
|---|---|---|
| *C09C 3/10* | (2006.01) | |
| *C04B 28/02* | (2006.01) | |
| *C04B 28/04* | (2006.01) | |
| *C04B 28/06* | (2006.01) | |
| *C04B 28/08* | (2006.01) | |
| *C04B 28/14* | (2006.01) | |
| *C04B 20/10* | (2006.01) | |
| *C09C 1/36* | (2006.01) | |
| *C09C 1/02* | (2006.01) | |
| *C04B 111/00* | (2006.01) | |
| *C04B 111/60* | (2006.01) | |
| *C04B 111/70* | (2006.01) | |
| *C04B 111/72* | (2006.01) | |
| *C04B 111/80* | (2006.01) | |

(52) U.S. Cl.
CPC ............ *C09C 3/10* (2013.01); *C04B 20/1033* (2013.01); *C04B 28/021* (2013.01); *C04B 28/04* (2013.01); *C04B 28/06* (2013.01); *C04B 28/065* (2013.01); *C04B 28/08* (2013.01); *C04B 28/14* (2013.01); *C09C 1/021* (2013.01); *C09C 1/3676* (2013.01); *C01P 2006/22* (2013.01); *C04B 2111/00517* (2013.01); *C04B 2111/00637* (2013.01); *C04B 2111/00672* (2013.01); *C04B 2111/60* (2013.01); *C04B 2111/70* (2013.01); *C04B 2111/72* (2013.01); *C04B 2111/802* (2013.01)

(58) Field of Classification Search
CPC ...................................................... C09C 3/10
See application file for complete search history.

(56) References Cited

U.S. PATENT DOCUMENTS

| | | | |
|---|---|---|---|
| 4,203,877 A | 5/1980 | Baker | |
| 4,528,321 A | 7/1985 | Allen et al. | |
| 4,725,665 A | 2/1988 | Pieh et al. | |
| 5,798,425 A | 8/1998 | Albrecht et al. | |
| 6,211,317 B1 | 4/2001 | Albrecht et al. | |
| 6,437,027 B1 | 8/2002 | Isomura et al. | |
| 6,565,645 B1 * | 5/2003 | Klein | C04B 24/2641 106/725 |
| 6,569,924 B2 | 5/2003 | Shendy et al. | |
| 6,620,879 B1 | 9/2003 | Albrecht et al. | |
| 6,869,988 B2 | 3/2005 | Schwartz et al. | |
| 6,946,510 B2 | 9/2005 | Suau et al. | |
| 7,973,110 B2 | 7/2011 | Lorenz et al. | |
| 7,994,259 B2 | 8/2011 | Sulser et al. | |
| 8,242,218 B2 | 8/2012 | Lorenz et al. | |
| 8,273,814 B2 | 9/2012 | Sulser et al. | |
| 8,349,979 B2 | 1/2013 | Hommer et al. | |
| 8,481,116 B2 | 7/2013 | Bleibler et al. | |
| 8,519,029 B2 | 8/2013 | Lorenz et al. | |
| 2004/0209979 A1 | 10/2004 | Schwartz et al. | |

(Continued)

FOREIGN PATENT DOCUMENTS

| | | |
|---|---|---|
| CN | 101962273 A | 2/2011 |
| DE | 29 48 698 A1 | 6/1981 |
| DE | 35 30 258 A1 | 2/1987 |
| DE | 195 13 126 A1 | 10/1996 |
| DE | 198 34 173 A1 | 2/1999 |
| DE | 199 05 488 A1 | 8/2000 |
| EP | 0 000 424 A1 | 1/1979 |
| EP | 0 126 528 A1 | 11/1984 |
| EP | 0 287 138 A1 | 10/1988 |
| EP | 1 052 232 A1 | 11/2000 |
| EP | 1 577 327 A1 | 9/2005 |
| EP | 1 889 858 A1 | 2/2008 |

(Continued)

*Primary Examiner* — Vickey Nerangis
(74) *Attorney, Agent, or Firm* — Oblon, McClelland, Maier & Neustadt, L.L.P.

(57) ABSTRACT

The invention relates to a pulverulent composition preparable by contacting a powder with 0.01 to 50 wt %, based on the overall mass of the composition, of a liquid component comprising at least one copolymer obtainable by polymerizing a mixture of monomers comprising (I) at least one ethylenically unsaturated monomer which comprises at least one radical from the series carboxylic acid, carboxylic salt, carboxylic ester, carboxylic amide, carboxylic anhydride, and carboxylic imide and (II) at least one ethylenically unsaturated monomer having a polyalkylene oxide radical, the liquid component comprising at least 1 wt % of the at least one copolymer and at least 30 wt % of an organic solvent, and the powder which is contacted with the liquid component comprising no inorganic binder. Further disclosed is a binder composition which comprises a pulverulent composition of the invention and an inorganic binder.

17 Claims, No Drawings

(56) References Cited

U.S. PATENT DOCUMENTS

2005/0143511 A1     6/2005   Suau et al.
2009/0312460 A1   12/2009   Lorenz et al.
2011/0040025 A1     2/2011   Deroo et al.

FOREIGN PATENT DOCUMENTS

| EP | 2 020 422 A1 | 2/2009 |
| WO | 01/42162 A1 | 6/2001 |
| WO | 01/96007 A1 | 12/2001 |
| WO | 2006/027363 A1 | 3/2006 |
| WO | 2006/084588 A1 | 8/2006 |
| WO | 2006/133933 A1 | 12/2006 |

\* cited by examiner

RAPIDLY SUSPENDABLE PULVERULENT COMPOSITION

This application is a § 371 of International Application No. PCT/EP2014/055782 filed Mar. 24, 2014, and claims priority from European Patent Application No. 13161133.7 filed Mar. 26, 2013.

The invention relates to a rapidly suspendable pulverulent composition which is preparable by contacting a powder with a liquid component comprising at least one copolymer and an organic solvent, the powder that is contacted with the liquid component comprising no inorganic binder. Further disclosed is a binder composition comprising the pulverulent composition of the invention.

In order to achieve improved workability, i.e., kneadability, spreadability, sprayability, pumpability, or flowability, for inorganic suspensions of solids, such suspensions are often admixed with admixtures in the form of dispersants or plasticizers.

Inorganic solids of these kinds in the construction industry usually comprise inorganic binders such as, for example, cement based on Portland cement (EN 197), cement with particular qualities (DIN 1164), white cement, calcium aluminate cement or high-alumina cement (EN 14647), calcium sulfoaluminate cement, specialty cements, calcium sulfate n-hydrate (n=0 to 2), lime or building lime (EN 459) and also pozzolans and latent hydraulic binders such as flyash, metakaolin, silica dust, and slag sand, for example. The inorganic suspensions of solids generally further comprise fillers, more particularly aggregate consisting of, for example, calcium carbonate, quartz, or other natural rocks in different granular sizes and granular morphologies, and also further inorganic and/or organic additives (admixtures) for the targeted influencing of properties of chemical-based construction products, such as hydration kinetics, rheology, or air content, for example. Additionally it is possible for organic binders to be present, such as latex powders, for example.

In order to convert building material mixtures, especially those based on inorganic binders, into a ready-to-use, workable form, it is generally necessary to use substantially more mixing water than theoretically required for the subsequent hydration or hardening process. The void fraction in the building element, formed by the excess water that subsequently evaporates, results in significantly impaired mechanical strength, stability, and durability of adhesion.

In order to reduce this excess water fraction in the case of a given working consistency and/or in order to improve the workability in the case of a given water/binder ratio, admixtures are used which within the construction chemicals segment are generally referred to as water reducers or plasticizers. Known such admixtures include, in particular, polycondensation products based on naphthalenesulfonic or alkylnaphthalenesulfonic acids, or melamine-formaldehyde resins containing sulfonic acid groups.

DE 3530258 describes the use of water-soluble sodium naphthalenesulfonic acid-formaldehyde condensates as admixtures for inorganic binders and building materials. These admixtures are described for improving the flowability of the binders such as cement, anhydrite, or gypsum, for example, and also the building materials produced using them.

DE 2948698 describes hydraulic mortars for screeds that comprise plasticizers based on melamine-formaldehyde condensation products, and/or sulfonated formaldehyde-naphthalene condensates and/or lignosulfonate, and comprising, as binders, Portland cement, clay-containing lime marl, clay clinker, and soft-fired clinker.

In addition to the purely anionic plasticizers, which comprise essentially carboxylic acid groups and sulfonic acid groups, a more recent group of plasticizers described comprises weakly anionic comb polymers, which typically carry anionic charges on the main chain and include nonionic polyalkylene oxide side chains.

WO 01/96007 describes these weakly anionic plasticizers and grinding assistants for aqueous mineral suspensions which are prepared by radical polymerization of monomers containing vinyl groups and which include polyalkylene oxide groups as a main component.

DE 19513126 and DE 19834173 describe copolymers based on unsaturated dicarboxylic acid derivatives and oxyalkylene glycol alkenyl ethers and the use thereof as admixtures for hydraulic binders, more particularly cement.

The aim of adding plasticizers in the construction industry is either to increase the plasticity of the binder system or to reduce the amount of water required under given processing conditions.

It has emerged that plasticizers based on lignosulfonate, melaminesulfonate, and polynaphthalenesulfonate are significantly inferior in their activity to the weakly anionic, polyalkylene oxide-containing copolymers. These copolymers are also referred to as polycarboxylate ethers (PCEs). Polycarboxylate ethers not only disperse the inorganic particles via electrostatic charging, owing to the anionic groups (carboxylate groups, sulfonate groups) present on the main chain, but also, furthermore, stabilize the dispersed particles by steric effects, owing to the polyalkylene oxide side chains, which by absorbing water molecules form a stabilizing protective layer around the particles.

As a result, it is either possible to reduce the required amount of water for the formulating of a particular consistency, as compared with the conventional plasticizers, or else the addition of the polycarboxylate ethers reduces the plasticity of the wet building material mixture to such an extent that it is possible to produce self-compacting concrete or self-compacting mortar with low water/cement ratios. The use of the polycarboxylate ethers also makes it possible to produce ready-mixed concrete or ready-mixed mortar that remains pumpable for lengthy periods of time, or to produce high-strength concretes or high-strength mortars through the formulation of a low water/cement ratio.

In addition to the polycarboxylate ethers described, a series of derivatives with a modified activity profile have also since become known. Thus, for example, US 2009312460 describes polycarboxylate esters, the ester function being hydrolyzed, following introduction into an aqueous, cementitious mixture, and a polycarboxylate ether being formed accordingly. An advantage of polycarboxylate esters is that they develop their activity in the cementitious mixture only after a certain time, and consequently the dispersing effect can be maintained over a lengthy period of time.

Furthermore, DE 199 05 488 discloses pulverulent polymer compositions based on polyether carboxylates, comprising 5 to 95 wt % of the water-soluble polymer and 5 to 95 wt % of a finely divided mineral carrier material. The products are produced by contacting the mineral carrier material with a melt or an aqueous solution of the polymer. Advantages touted for this product in comparison to spray-dried products include a significantly enhanced resistance toward sticking and accretion.

WO 2006/027363 discloses a method for producing a coated base material for a hydraulic composition. Disclosures in the examples include the coating of a Portland cement with 1% of an aqueous polycarboxylate ether solution, based on the binder weight.

WO 2006/027363 relates to a method for producing a coated basic material for a hydraulic composition comprising a basic material and water. The basic material can consist of several sub-groups and at least one hydraulic binding agent. Prior to the mixing of the hydraulic composition, the basic material is at least partially coated, for example fly ash or silica fume is coated with an additive, for instance a dispersing agent on the basis of a polycarboxylate. The additive can be mixed with a solvent, which is preferably water, whereby such solvent evaporates following addition. The use of an organic solvent is not described.

US 2004/0209979 discloses a gypsum composition suitable for use in the manufacture of gypsum products. The gypsum composition includes gypsum, water, and a solid dispersant comprising a supported acrylic/polyether comb-branched copolymer. The dispersants is made by first preparing a copolymer composition, which is then dissolved or dispersed in a liquid carrier and then converting the liquid in a manner to allow the dispersant copolymer to be utilized in a solid-flowable form. The use of an organic solvent as liquid carrier is not described.

EP 1052232 relates to a process for producing a powdery dispersant for preparing hydraulic compositions, which process includes adding an reducing agent to a solution predominantly containing a polycarboxylate polymer compound having a polyalkylene glycol chain, drying the resultant mixture, and pulverizing the dried product. To improve the moisture absorbability or blocking ability an inorganic powder may further be incorporated into the powdery dispersant after drying. Mixing of a liquid dispersant with an inorganic powder is not disclosed.

Dispersants based on polycarboxylate ethers and derivatives thereof are available either as solids in powder form or as aqueous solutions. Polycarboxylate ethers in powder form can be admixed to a factory dry-mix mortar, for example, in the course of its production. When the factory dry-mix mortar is batched with water, the polycarboxylate ethers dissolve and are able subsequently to develop their effect.

Alternatively it is also possible to add polycarboxylate ethers or derivatives thereof to the inorganic suspension of solids in dissolved form. The dispersant may more particularly be metered directly into the mixing water.

A disadvantage of all existing methods for incorporating plasticizers into an inorganic suspension of solids, however, is that the dispersing activity does not develop immediately after addition of the mixing water. Irrespective of whether the dispersant is added as a powder or in aqueous solution, it may take more than 100 seconds, for example, in a dry mortar—depending on water-to-cement ratio (w/c) or water demand—for a homogeneous suspension to form with vigorous stirring after the addition of the mixing water. This delay is a problem particularly in the context of the use of mixing pumps.

It was an object of the present invention, accordingly, to provide pulverulent compositions which exhibit more rapid development of the dispersing effect of the plasticizer over time following addition of mixing water than has been possible with the existing compositions.

This object has been achieved by means of a pulverulent composition preparable by contacting a powder with 0.01 to 50 wt %, more particularly 0.01 to 25 wt %, preferably 0.5 to 15 wt %, especially preferably 0.5 to 4 wt %, based on the overall mass of the composition, of a liquid component comprising at least one copolymer obtainable by polymerizing a mixture of monomers comprising (I) at least one ethylenically unsaturated monomer which comprises at least one radical from the series carboxylic acid, carboxylic salt, carboxylic ester, carboxylic amide, carboxylic anhydride, and carboxylic imide and (II) at least one ethylenically unsaturated monomer having a polyalkylene oxide radical, the liquid component comprising at least 1 wt %, preferably between 5 and 70 wt %, more particularly between 25 and 60 wt %, of the at least one copolymer and at least 30 wt %, preferably between 98 and 30 wt %, more particularly between 90 and 30 wt %, and more preferably between 75 and 40 wt % of an organic solvent, and the powder which is contacted with the liquid component comprising no inorganic binder.

Surprisingly it has been found here not only that the stated object can be fully achieved but also that the pulverulent composition exhibits excellent working properties in addition to the outstanding dispersibility at the same time. More particularly it has been possible to observe a marked reduction in dusting during handling of the pulverulent composition.

In one preferred embodiment, the powder is coated with the liquid component. The pulverulent composition of the invention displays a very rapid development of the dispersing effect of the copolymer over time following addition of mixing water, and this is greatly advantageous, for example, for the dispersing of pigments. Surprisingly, though, it has also been found that the dispersing of a pulverulent mixture comprising the pulverulent composition of the invention leads to a marked acceleration in the development of the dispersing effect of the copolymer over time following addition of mixing water, as compared with the addition of the copolymer in the mixing water or in the form of a powder. The pulverulent composition of the invention is therefore also suitable in particular for inorganic binder composition, where first of all a selected component of the binder composition, a filler, for example, is contacted with the copolymer of the invention, and subsequently the inorganic binder and any other components are mixed in.

The copolymers in accordance with the present invention comprise at least two monomer units. It may, though, also be advantageous to use copolymers having three or more monomer units.

In one preferred embodiment, the ethylenically unsaturated monomer (I) is represented by at least one of the following general formulae from the group (Ia), (Ib), and (Ic):

For the monocarboxylic or dicarboxylic acid derivative (Ia) and for the monomer (Ib) in cyclic form, where Z represents O (acid anhydride) or $NR^2$ (acid imide), $R^1$ and $R^2$ independently of one another are hydrogen or an aliphatic hydrocarbon radical having 1 to 20 C atoms, preferably a methyl group. Y is H, —COOM$_a$, —CO—O(C$_q$H$_{2q}$O)$_r$—R$^3$, or —CO—NH—(C$_q$H$_{2q}$O)$_r$—R$^3$.

M is hydrogen, a monovalent or divalent metal cation, preferably sodium, potassium, calcium, or magnesium ion, additionally ammonium or an organic amine radical, and a=½ or 1, according to whether M is a monovalent or a divalent cation. Organic amine radicals used are preferably substituted ammonium groups deriving from primary, secondary, or tertiary C$_{1-20}$ alkylamines, C$_{1-20}$ alkanolamines, C$_{5-8}$ cycloalkylamines, and C$_{6-14}$ arylamines. Examples of the amines in question are methylamine, dimethylamine, trimethylamine, ethanolamine, diethanolamine, triethanolamine, methyldiethanolamine, cyclohexylamine, dicyclohexylamine, phenylamine, and diphenylamine in the protonated (ammonium) form.

R$^3$ is hydrogen, an aliphatic hydrocarbon radical having 1 to 20 C atoms, a cycloaliphatic hydrocarbon radical having 5 to 8 C atoms, an aryl radical having 6 to 14 carbon atoms, it being possible optionally for this radical to be substituted, q=2, 3, or 4, and r=0 to 200, preferably 1 to 150. The aliphatic hydrocarbons here may be linear or branched and also saturated or unsaturated. Preferred cycloalkyl radicals are considered to be cyclopentyl or cyclohexyl radicals, and preferred aryl radicals are considered to be phenyl or naphthyl radicals, which in particular may also be substituted by hydroxyl, carboxyl, or sulfonic acid groups.

The following formula represents the monomer (Ic):

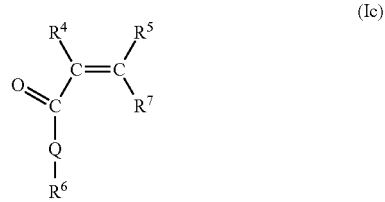

(Ic)

In this formula, R$^4$ and R$^5$ independently of one another are hydrogen or an aliphatic hydrocarbon radical having 1 to 20 C atoms, a cycloaliphatic hydrocarbon radical having 5 to 8 C atoms, or an optionally substituted aryl radical having 6 to 14 C atoms. Q may be identical or different and is represented by NH, NR$^3$, or O, with R$^3$ possessing the definition stated above.

Furthermore, R$^6$ is identical or different and is represented by (C$_n$H$_{2n}$)—SO$_3$H with n=0, 1, 2, 3, or 4, (C$_n$H$_{2n}$)—OH with n=0, 1, 2, 3, or 4; (C$_n$H$_{2n}$)—PO$_3$H$_2$ with n=0, 1, 2, 3, or 4, (C$_n$H$_{2n}$)—OPO$_3$H$_2$ with n=0, 1, 2, 3, or 4, (C$_6$H$_4$)—SO$_3$H, (C$_6$H$_4$)—PO$_3$H$_2$, (C$_6$H$_4$)—OPO$_3$H$_2$, and (C$_n$H$_{2n}$)—NR$^8{}_b$ with n=0, 1, 2, 3, or 4 and b=2 or 3.

R$^7$ is H, —COOM$_a$, —CO—O(C$_q$H$_{2q}$O)$_r$—R$^3$, or —CO—NH—(C$_q$H$_{2q}$O)$_r$—R$^3$, where M$_a$, R$^3$, q, and r possess the definitions stated above.

R$^8$ is hydrogen, an aliphatic hydrocarbon radical having 1 to 10 C atoms, a cycloaliphatic hydrocarbon radical having 5 to 8 C atoms, or an optionally substituted aryl radical having 6 to 14 C atoms.

With further preference in the sense of the present invention, the ethylenically unsaturated monomer (II) is represented by the following general formula:

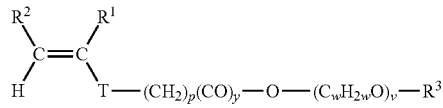

(II)

where p is an integer between 0 and 6, y is 0 or 1, v is an integer between 3 and 500, and w independently at each occurrence for each (C$_w$H$_{2w}$O) unit is identical or different and is an integer between 2 and 18, and also T is oxygen or a chemical bond. R$^1$, R$^2$, and R$^3$ possess the definition stated above.

In one preferred embodiment, in the general formula (II), p is an integer between 0 and 4, v is an integer between 5 and 250, and w independently at each occurrence for each (C$_w$H$_{2w}$O) unit is identical or different and is 2 or 3.

In one particularly preferred embodiment, in the general formula (II), p is 4, v is an integer between 10 and 120, and w independently at each occurrence for each (C$_w$H$_{2w}$O) unit is identical or different and is 2 or 3, T is oxygen, and y is 0. In this case it is particularly preferred for at least one subregion to be formed by a random ethylene oxide/propylene oxide copolymer and for the molar fraction of propylene oxide units to be preferably 10 to 30 mol %, based on the sum of the ethylene oxide units and propylene oxide units in the random ethylene oxide/propylene oxide copolymer or in the corresponding subregion.

More particularly the at least one ethylenically unsaturated monomer having a polyalkylene oxide radical (II) may be a compound of the formula (III). The block A consists of a polyethylene oxide unit, with n preferably representing a number from 20 to 30. The block B consists of a random ethylene oxide/propylene oxide copolymer unit, with k preferably representing a number from 5 to 10 and l preferably representing a number from 20 to 35.

(III)

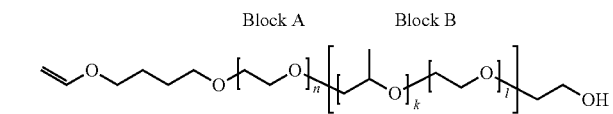

In a further preferred embodiment of the invention, the ethylenically unsaturated monomer (II) comprises at least one compound of the general formulae (IV), (V), (VI), and (VII),

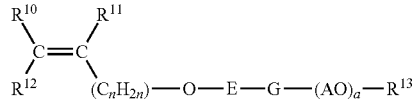

(IV)

where
R$^{10}$, R$^{11}$, and R$^{12}$ are each identical or different and independently of one another represented by H and/or an unbranched or branched C$_1$-C$_4$ alkyl group, preferably H and/or CH$_3$;
E is identical or different and is represented by an unbranched or branched C$_1$-C$_6$ alkylene group, more particularly C$_1$, C$_2$, C$_3$, C$_4$, C$_5$, or C$_6$, admittedly in each case typically, but preferably C$_2$ and C$_4$, a cyclohexyl group, CH$_2$—C$_6$H$_{10}$, C$_6$H$_4$ present in ortho, meta, or para substituted form, and/or an absent unit, i.e., E is not present;
G is identical or different and is represented by O, NH and/or CO—NH, with the proviso that if E is an absent unit, G is also an absent unit, i.e., G is not present;
A is identical or different and is represented by C$_x$H$_{2x}$ with x=2, 3, 4, and/or 5, preferably x=2, and/or CH$_2$CH(C$_6$H$_5$);
n is identical or different and is represented by 0, 1, 2, 3, 4 and/or 5;
a is identical or different and is represented by an integer from 2 to 350, preferably 10-200;
R$^{13}$ is identical or different and is represented by H, an unbranched or branched C$_1$-C$_4$ alkyl group, CO—NH$_2$, and/or COCH$_3$, preferably H or CH$_3$;

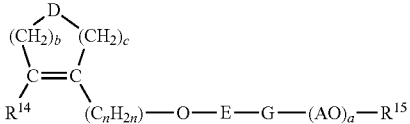

(V)

where
R$^{14}$ is identical or different and is represented by H and/or an unbranched or branched C$_1$-C$_4$ alkyl group, preferably H;
E is identical or different and is represented by an unbranched or branched C$_1$-C$_6$ alkylene group, preferably C$_2$H$_4$, a cyclohexyl group, CH$_2$—C$_6$H$_{10}$, C$_6$H$_4$ present in ortho, meta, or para substituted form, and/or by an absent unit, i.e., E is not present;
G is identical or different and is represented by an absent unit, O, NH and/or CO—NH, with the proviso that if E is an absent unit, G is also an absent unit, i.e., G is not present;
A is identical or different and is represented by C$_x$H$_{2x}$ with x=2, 3, 4, and/or 5, preferably x=2, and/or CH$_2$CH(C$_6$H$_5$);
n is identical or different and is represented by 0, 1, 2, 3, 4 and/or 5;
a is identical or different and is represented by an integer from 2 to 350, preferably 10-200;
D is identical or different and is represented by an absent unit, i.e., D is not present, or by NH and/or O, with the proviso that if D is an absent unit: b=0, 1, 2, 3, or 4 and also c=0, 1, 2, 3, or 4, with b+c=3 or 4, and
with the proviso that if D is NH and/or O: b=0, 1, 2, or 3, c=0, 1, 2, or 3, and b+c=2 or 3;
R$^{15}$ is identical or different and is represented by H, an unbranched or branched C$_1$-C$_4$ alkyl group, CO—NH$_2$, and/or COCH$_3$, preferably H;

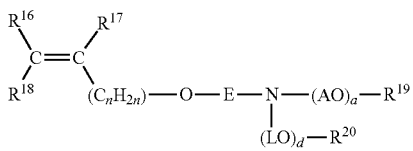

where
R$^{16}$, R$^{17}$, and R$^{18}$ are each identical or different and independently of one another are represented by H and/or an unbranched or branched C$_1$-C$_4$ alkyl group, preferably H and/or CH$_3$;
E is identical or different and is represented by an unbranched or branched C$_1$-C$_6$ alkylene group, preferably C$_2$H$_4$ or C$_4$H$_8$, a cyclohexyl group, CH$_2$—C$_6$H$_{10}$, C$_6$H$_4$ present in ortho, meta, or para substituted form, and/or by an absent unit, i.e., E is not present;
A is identical or different and is represented by C$_x$H$_{2x}$ with x=2, 3, 4 and/or 5, preferably x=2, and/or CH$_2$CH(C$_6$H$_5$);
n is identical or different and is represented by 0, 1, 2, 3, 4 and/or 5;
L is identical or different and is represented by C$_x$H$_{2x}$ with x=2, 3, 4 and/or 5, preferably x=2, and/or CH$_2$—CH(C$_6$—H$_5$);
a is identical or different and is represented by an integer from 2 to 350, preferably 10-200;
d is identical or different and is represented by an integer from 1 to 350, preferably 10-200;
R$^{19}$ is identical or different and is represented by H and/or an unbranched or branched C$_1$-C$_4$ alkyl group, preferably H,
R$^{20}$ is identical or different and is represented by H and/or an unbranched C$_1$-C$_4$ alkyl group, preferably H.

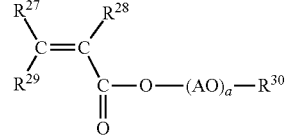

(VII)

in which
R$^{27}$, R$^{28}$, and R$^{29}$ are identical or different and independently of one another are H and/or an unbranched or branched C$_1$-C$_4$ alkyl radical;
A are identical or different and denote C$_x$H$_{2x}$ with x=2, 3, 4 and/or 5 and/or CH$_2$CH(C$_6$H$_5$);
a are identical or different and are an integer between 2 and 350;
R$^{30}$ are identical or different and are H and/or an unbranched or branched C$_1$-C$_4$ alkyl radical.

Generally it can be said that the polyalkoxy side chains (AO)$_a$ of the polyether macro-monomers are very preferably pure polyethoxy side chains, although there may preferably also be mixed polyalkoxy side chains present, more particularly those which contain both propoxy groups and ethoxy groups.

In practice the polyether macromonomer frequently used is alkoxylated isoprenol, i.e., alkoxylated 3-methyl-3-buten-1-ol, and/or alkoxylated hydroxybutyl vinyl ether and/or alkoxylated (meth)allyl alcohol, with allyl alcohol being preferred over methallyl alcohol, having normally in each case an arithmetically mean number of oxyalkylene groups of 4 to 350. Particularly preferred is alkoxylated hydroxybutyl vinyl ether.

Besides the monomers (I) and (II) there may also be further types of monomer employed in the copolymer of the invention. In one particularly preferred embodiment, however, the copolymer of the invention comprises no styrene or derivatives of styrene as monomers.

The molar fraction of the monomers (I) and (II) in the copolymer of the invention may be selected freely within wide ranges. It has proven particularly advantageous if the fraction of the monomer (I) in the copolymer is 5 to 95 mol %, preferably 30 to 95 mol %, and more particularly 55 to 95 mol %. In a further preferred embodiment, the fraction of the monomer (II) in the copolymer is 1 to 89 mol %, more particularly 1 to 55 mol %, and more preferably 1 to 30 mol %.

It is considered preferable here for the monomer (II) to have a molecular weight of 500 to 10 000 g/mol.

In one further preferred embodiment, the copolymer of the invention possesses a molecular weight of 12 000 to 75 000 g/mol, determined by gel permeation chromatography against polyethylene glycol standards.

Serving as organic solvent may be, preferably, all organic solvents in which the copolymer of the invention has a good solubility. With more particular preference at least 1 wt %, preferably at least 25 wt %, and more particularly at least 40 wt % of the copolymer ought to dissolve in the organic solvent, based on the overall mass of solvent and copolymer. The solubility of the copolymer is dependent on the monomers selected specifically and on the proportions of the monomers employed, and may be ascertained by means of simple experiments. More particularly the solvent in question is at least one solvent from the series ethyl acetate, n-butyl acetate, 1-methoxy-2-propyl acetate, ethanol, isopropanol, n-butanol, 2-ethylhexanol, 1-methoxy-2-propanol, ethylene glycol, propylene glycol, acetone, butanone, pentanone, hexanone, methyl ethyl ketone, ethyl acetate, butyl acetate, amyl acetate, tetrahydrofuran, diethyl ether, toluene, xylene, or higher-boiling alkylbenzenes. The solvent may further be polyethylene glycol ethers or polypropylene glycol ethers or random ethylene oxide/propylene oxide copolymers having an average molar mass of 200 to 2000 g/mol, mono-, di-, or triethylene glycol, mono-, di-, or tripropylene glycol, methyl, ethyl, propyl, butyl, or higher alkyl polyalkylene glycol ethers having 1, 2, 3, or more ethylene glycol and/or propylene glycol units, as for example methoxypropanol, dipropylene glycol monomethyl ether, tripropylene glycol monomethyl ether, ethylene glycol monobutyl ether, diethylene glycol monobutyl ether, butyl polyethylene glycol ether, propyl polyethylene glycol ether, ethyl polyethylene glycol ether, methyl polyethylene glycol ether, dimethyl polyethylene glycol ether, dimethyl polypropylene glycol ether, glycerol ethoxylates having a molecular weight of 200 to 20 000 g/mol, pentaerythritol alkoxylates, ethylene carbonate, propylene carbonate, glycerol carbonate, glycerol formal, and 2,3-O-isopropylideneglycerol. With more particular preference the solvent comes from alkyl polyalkylene glycol ethers and more preferably methyl polyethylene glycol ether and also polyethylene glycol ethers, polypropylene glycol ethers, and random ethylene oxide/propylene oxide copolymers having an average molar mass of 200 to 2000 g/mol. Further preferred are solvents based on carbonates, more particularly ethylene carbonate, propylene carbonate, and glycerol carbonate.

The liquid component of the invention may also comprise water. A high water content in the liquid component may lead to a deterioration in the shelf life of the pulverulent composition, depending on the ingredients of the pulverulent composition and particularly in the case of the subsequent admixing of inorganic binders. With particular preference, therefore, the water content is <10 wt %, more particularly <2.5 wt %. The water content may in particular be between 30 and 0.01 wt %, preferably between 10 and 0.01 wt %, and more preferably between 2 and 0.1 wt % of the liquid component. Hence, in particular, the use of water scavengers may be advantageous. These water scavengers either bind water into their crystal structure, or consume the water by other mechanisms before the binder can react with it and before an adverse effect on product quality is caused. The scavenger in question may more particularly comprise molecular sieve or salts which bind water rapidly, such as CaO, for example. Water scavengers can lead to high water tolerance on the part of the pulverulent composition of the invention, particularly in the case of the subsequent admixing of inorganic binders, and in that case no deterioration is observed in the shelf life of the pulverulent composition of the invention.

As far as the solubility of the copolymer of the invention in the liquid component is concerned, it has proven particularly advantageous if the monomer (I) or (II) comprises a random ethylene oxide/propylene oxide copolymer having a molecular weight of 160 to 10 000 g/mol, more particularly of 500 to 6000 g/mol, where the molar fraction of propylene oxide units is preferably 10% to 30%, based on the sum of the ethylene oxide and propylene oxide units. In that case the organic solvent with more particular preference comprises alkyl polyalkylene glycol ethers and very preferably methyl polyethylene glycol ether, and also polyethylene glycol ethers, polypropylene glycol ethers, and random ethylene oxide/propylene oxide copolymers having an average molar mass of between 200 and 2000 g/mol.

In order to achieve extremely good acceleration of the development of the dispersing effect of the copolymer over time following addition of mixing water, it is advantageous if the at least one copolymer of the invention is present in the liquid component in a fraction of at least 50 wt %, preferably at least 80 wt %, and more preferably at least 99 wt % in dissolved form. More particularly the copolymer is present in solution in the liquid component.

The contacting of the powder with the liquid component comprising the copolymer of the invention may be done in any manner known for such a purpose to the skilled person. It has proven particularly appropriate for the liquid component to be contacted with the powder by spraying or atomizing, with the process preferably encompassing a mixing step. In this way it is simple to ensure homogenous application in conjunction with effective adhesion, including initial adhesion. The contacting of the powder with the liquid component may also, of course, take place in any other suitable way. Options here also include, in particular, blending or stirring in, although there is a distinct preference for spray application, since it represents the most simple and most economically attractive form of application. In one preferred embodiment, the pulverulent composition according to the invention comprises the powder and the liquid component. It has to be clear that, in this preferred embodiment, the preparation of the pulverulent composition comprises no physical drying step, after the addition of the liquid component.

In one particularly preferred embodiment it is also possible for other additives as well to be admixed to the liquid component, depending on intended use, these additives preferably being in dissolved form. The liquid component may more particularly comprise 0.5 to 69 wt % of at least one further additive, based on the overall mixture. By this means it is possible to admix the pulverulent composition with further additives in a simple way, and this represents a particularly economic procedure and may optionally also remove the need for a separate drying step. As a result of the particularly homogeneous distribution of the further additive, its effect directly after mixing with water may be improved, and this is considered a further advantage of this embodiment.

In a further-preferred embodiment, the liquid component consists of a solution of the copolymer of the invention in an organic solvent.

In the context of the present invention, the pulverulent composition ought preferably to be in dry form, this meaning that it has a Karl-Fischer water content of less than 10 wt %, preferably less than 5 wt %, and more preferably of less than 2 wt %.

It is preferred for the powder which is contacted with the liquid component to have an average particle size of between 0.1 and 1000 µm, more preferably between 1 and 200 µm. The particle size here is determined by means of laser diffractometry.

In one particularly preferred embodiment, the pulverulent composition of the invention comprises at least one compound of series silica sand, finely ground quartz, limestone, heavy spar, calcite, aragonite, vaterite, dolomite, talc, kaolin, mica, chalk, titanium dioxide, rutile, anatase, aluminum hydroxide, aluminum oxide, magnesium hydroxide, and brucite. More particularly the powder which is contacted with the liquid component may consist to an extent of at least 50 wt %, more particularly at least 90 wt %, and very preferably at least 98 wt % of at least one compound from the series silica sand, finely ground quartz, limestone, heavy spar, calcite, aragonite, vaterite, dolomite, talc, kaolin, mica, chalk, titanium dioxide, rutile, anatase, aluminum hydroxide, aluminum oxide, magnesium hydroxide, and brucite. More particularly, therefore, the powder which is contacted with the liquid component may be a compound suitable as filler for an inorganic binder composition.

The present invention additionally provides a binder composition comprising a pulverulent composition of the invention and an inorganic binder.

The inorganic binder is preferably at least one from the series cement based on Portland cement, white cement, calcium aluminate cement, calcium sulfoaluminate cement, calcium sulfate n-hydrate, and latent hydraulic and/or pozzolanic binder.

The binder composition is preferably a dry mortar. As a result of continual efforts toward substantial rationalization and improved product quality, mortars for a wide variety of uses in the construction sector are nowadays virtually no longer mixed together on the site itself from the starting materials. This function is nowadays largely carried out at the factory in the construction materials industry, and the ready-to-use mixtures are supplied in the form of what are called factory dry-mix mortars. Completed mixtures which can be made workable on site exclusively by addition of water and commixing are referred to according to DIN 18557 as factory mortars, more particularly as factory dry-mix mortars. Mortar systems of this kind may fulfill any of a very wide variety of physical construction objectives. Depending on the objective that exists, the binder, which may comprise cement and/or lime and/or calcium sulfate, for example, is admixed with further additives or admixtures in order to adapt the factory dry-mix mortar to the specific application. The additives and admixtures in question may include, for example, shrinkage reducers, expansion agents, accelerators, retardants, dispersants, thickeners, defoamers, air entrainers, and corrosion inhibitors. The factory dry-mix mortar of the invention may more particularly comprise masonry mortars, render mortars, mortars for thermal insulation composite systems, renovating renders, jointing mortars, tile adhesives, thin-bed mortars, screed mortars, casting mortars, injection mortars, filling compounds, grouts, or lining mortars (e.g., for pipes for drinking water).

In one particular embodiment the factory dry-mix mortar of the invention may also be a self-leveling underlayment composition. This is particularly advantageous since pulverulent compositions of this kind, for low layer thicknesses, are generally very fine and their mixing up with water is therefore comparatively slow.

Likewise included are factory mortars which when produced on the building site may be provided not only with water but also with further components, more particularly liquid and/or pulverulent additives and/or with aggregates (two-component systems).

The present invention additionally provides a method for producing a binder composition of the invention, where a pulverulent composition of the invention is mixed with an inorganic binder and optionally further additives.

In the case of the binder composition of the invention comprising at least one inorganic binder, the binder may in particular also be a binder mixture. In the present context this means mixtures of at least two binders from the series cement, pozzolanic and/or latent hydraulic binder, white cement, specialty cement, calcium aluminate cement, calcium sulfoaluminate cement, and the various water-containing and water-free calcium sulfates. These mixtures may then optionally also comprise other additives.

The pulverulent composition of the invention in one preferred embodiment comprises at least one organic and/or inorganic pigment, suitable more particularly for the production of paints, inks, and plastics, and also printer-inks. The powder of the invention is preferably an inorganic pigment. The pulverulent composition of the invention may in this case preferably comprise at least one compound from the series titanium dioxides, zinc sulfides, zinc oxides, iron oxides, magnetites, manganese iron oxides, chromium oxides, ultramarine, nickel antimony titanium oxides, chromium antimony titanium oxides, manganese titanium rutiles, cobalt oxides, mixed oxides of cobalt and aluminum, rutile mixed phase pigments, sulfides of the rare earths, spinels of cobalt with nickel and zinc, spinels based on iron and chromium with copper, zinc, and manganese, bismuth vanadates, and also extender pigments. More particularly the pulverulent composition of the invention may comprise the Colour Index pigments Pigment Yellow 184, Pigment Yellow 53, Pigment Yellow 42, Pigment Yellow Brown 24, Pigment Red 101, Pigment Blue 28, Pigment Blue 36, Pigment Green 50, Pigment Green 17, Pigment Black 11, Pigment Black 33, and Pigment White 6. Also preferred are mixtures of inorganic pigments. Mixtures of organic with inorganic pigments may likewise be employed. The compositions of the invention on such a basis are suitable for producing pigment dispersions which can be employed as tinting pastes, pigment slurries, pigment dispersions, or pigment preparations in the paint and varnish industry, in the ceramics industry and, among others, in the textile and leather industries.

In particular it is also possible to produce compositions of the invention based on transparent iron oxide pigments that can be used to produce transparent aqueous or solvent borne varnishes for wood coating.

In one particular embodiment, the pulverulent composition of the invention is used in aqueous emulsion paints. In this case the pulverulent composition of the invention is based preferably on a powder based on white pigment, more particularly titanium dioxide, barium sulfate, and zinc sulfite and/or on chromatic pigment, more particularly iron oxide pigments, chromium dioxide, and cobalt spinel pigments and/or natural or precipitated calcium carbonate, talc, kaolin, finely ground quartz, and other mineral pigments. The powder which is contacted with the liquid component may more particularly consist to an extent of at least 50 wt %, more particularly at least 90 wt %, and very preferably at least 98 wt % of at least one organic and/or inorganic pigment.

The present invention further provides a method for producing a liquid component comprising at least 30 wt % of an organic solvent, not more than 30 wt % of water, more particularly less than 10 wt % and more preferably less than 2.5 wt % of water, and also a copolymer obtained by polymerizing a mixture of monomers comprising (I) at least one ethylenically unsaturated monomer which comprises at least one radical from the series carboxylic acid, carboxylic salt, carboxylic ester, carboxylic amide, carboxylic anhydride, and carboxylic imide and (II) at least one ethylenically unsaturated monomer having a polyalkylene ether radical, where the polymerization of the monomers is carried out in a hydrous solvent, the water content of the overall reaction mixture being more than 10 wt %, more particularly more than 20 wt %, and more preferably more than 40 wt %, the polymerization product is admixed with an organic solvent, and water is removed.

The removal of the water may be carried out by all of the techniques known for this purpose to the skilled person. In particular, thin-film evaporators have proven particularly suitable.

With more particular preference the monomer (I) comprises the aforementioned compounds of the formula (Ia), (Ib), and (Ic), and the monomer (II) comprises the aforementioned compound of the formula (II).

Suitable solvent when preparing the copolymers of the invention is more particularly water. The possibility also exists, though, of using a mixture of water and an organic solvent, in which case the solvent ought to be very largely inert in its behavior with respect to radical polymerization reactions. As far as the organic solvent is concerned, the organic solvents already identified above, in particular, are considered to be particularly suitable.

The polymerization reaction takes place preferably in the temperature range between 0 and 180° C., more preferably between 10 and 100° C., and also under atmospheric pressure or under elevated or reduced pressure. The polymerization may optionally also be performed under an inert gas atmosphere, preferably under nitrogen.

To initiate the polymerization it is possible to use high-energy electromagnetic radiation, mechanical energy, or chemical polymerization initiators such as organic peroxides, examples being benzoyl peroxide, tert-butyl hydroperoxide, methyl ethyl ketone peroxide, cumoyl peroxide, dilauroyl peroxide, or azo initiators, such as azodiisobutyronitrile, azobisamidopropyl hydrochloride, and 2,2'-azobis (2-methyl-butyronitrile), for example. Likewise suitable are inorganic peroxy compounds, such as ammonium peroxodisulfate, potassium peroxodisulfate, or hydrogen peroxide, for example, optionally in combination with reducing agents (e.g., sodium hydrogensulfite, ascorbic acid, iron(II) sulfate) or redox systems, which as reducing component comprise an aliphatic or aromatic sulfonic acid (e.g., benzenesulfonic acid, toluenesulfonic acid).

Particular preference is given to a mixture of at least one sulfinic acid with at least one iron(III) salt, and/or to a mixture of ascorbic acid with at least one iron(III) salt.

Chain transfer agents used, which regulate the molecular weight, are the customary compounds. Suitable known such agents are, for example, alcohols, such as methanol, ethanol, propanol, isopropanol, n-butanol, sec-butanol, and amyl alcohols, aldehydes, ketones, alkylthiols, such as dodecylthiol and tert-dodecylthiol, for example, thioglycolic acid, isooctyl thioglycolate, 2-mercaptoethanol, 2-mercaptopropionic acid, 3-mercapto-propionic acid, and some halogen compounds, such as carbon tetrachloride, chloroform, and methylene chloride, for example.

In an alternative further embodiment the process for preparing the copolymers of the invention may also be carried out in an organic solvent or in a mixture of two or more organic solvents. In particular, again, in this regard, the organic solvents already identified earlier on above are considered to be particularly suitable.

The present invention further provides the use of a liquid component comprising at least 30 wt %, preferably between 98 and 30 wt %, more particularly between 90 and 30 wt %, and more preferably between 75 and 40 wt % of an organic solvent and at least 1 wt %, preferably between 5 and 70 wt %, more particularly between 25 and 60 wt %, of at least one copolymer obtainable by polymerizing a mixture of monomers comprising (I) at least one ethylenically unsaturated monomer which comprises at least one radical from the series carboxylic acid, carboxylic salt, carboxylic ester, carboxylic amide, carboxylic anhydride, and carboxylic imide and (II) at least one ethylenically unsaturated monomer having a polyalkylene ether radical, for treating a powder which comprises no inorganic binder, for accelerating the development of the dispersing effect of the copolymer over time following addition of mixing water, where 0.01 to 50 wt %, more particularly 0.01 to 25 wt %, preferably 0.5 to 15 wt %, especially preferably 0.5 to 4 wt %, of the liquid component is used, based on the overall mass of the treated powder, and where the treated powder is optionally mixed with an inorganic binder before the mixing water is added.

In one particular preference, again, the monomer (I) comprises the aforementioned compounds of the formula (Ia), (Ib), (Ic), and the monomer (II) comprises the aforementioned compound of the formula (II).

The examples which follow are intended to elucidate the invention in more detail.

EXAMPLES

Gel Permeation Chromatography

Sample preparation for determination of the molar weight was carried out by dissolving copolymer solution in the GPC eluent, giving a polymer concentration in the GPC eluent of 0.5 wt %. Thereafter this solution was filtered through a syringe filter with polyethersulfone membrane and a pore size of 0.45 μm. The injection volume of this filtrate was 50-100 μl.

The average molecular weights were determined on a GPC instrument from Waters with the model name Alliance 2690 with a UV detector (Waters 2487) and RI detector (Waters 2410).

Columns:
Shodex SB-G Guard Column for SB-800 HQ series
Shodex OHpak SB 804HQ and 802.5HQ
(PHM gel, 8×300 mm, pH 4.0 to 7.5)
Eluent: 0.05 M aqueous ammonium formate/methanol mixture=80:20 (parts by volume)
Flow rate: 0.5 ml/min
Temperature: 50° C.
Injection: 50 to 100 μl
Detection: RI and UV The molecular weights of the copolymers were determined relative to polyethylene glycol standards from the company PSS Polymer Standards Service GmbH. The molecular weight distribution curves of the polyethylene glycol standards were determined by means of light scattering. The masses of the polyethylene glycol standards were 682 000, 164 000, 114 000, 57 100, 40 000, 26 100, 22 100, 12 300, 6240, 3120, 2010, 970, 430, 194, and 106 g/mol.

Composition of the Copolymers

The synthesis of the copolymers used is described for example in WO2006133933 page 12, line 5 to page 13, line 26. The composition of the copolymers used is as follows:

TABLE 1

| Polymer | Mol of acrylic acid | Mol of macromonomer | Macromonomer | Mw (g/mol) | Solids % |
|---|---|---|---|---|---|
| A | 5 | 1 | VOBPEG-3000 | 32 000 | 51 |
| B | 10 | 1 | VOBPEG-3000 | 25 000 | 51 |
| C | 5 | 1 | VOBPEPG-3000 | 27 000 | 51 |
| D | 10 | 1 | VOBPEPG-3000 | 21 000 | 51 |

The abbreviation VOBPEG-3000 stands for vinyoxybutyl-polyethylene glycol with a molar mass of 3000 g/mol, i.e. of formula (III) k=0, l=0, and n~68.

The abbreviation VOBPEPG-3000 stands for vinyloxybutyl-polyethylene/propylene glycol of blockwise construction. Block A contains only polyethylene glycol; block B is a random mixture of ethylene glycol and propylene glycol. The molar mass is 3000 g/mol. The structure corresponds to formula (III) with n~23, k~13, l~28.

PREPARATION EXAMPLES

General Preparation Example (Copolymer in Methyl Polyethylene Glycol 500)

A 2000 ml round-bottom flask is charged with a 51% strength aqueous solution of the copolymer. Methyl polyethylene glycol 500 (Pluriol® A 500 E from BASF SE) is added. The water is then stripped off at 70° C. and 40 mbar on a rotary evaporator. At a water content of below 1 wt %, stripping is discontinued and the batch is cooled. The resulting solution is slightly opalescent and has an active ingredient content of 50 wt %.

TABLE 2

| Example | Copolymer | Copolymer (aqueous solutions) | Methyl polyethylene glycol 500 | Active ingredient content [%] |
|---|---|---|---|---|
| 1 | A | 980 g, 51% strength solution | 500 g | 50 |
| 2 | C | 980 g, 51% strength solution | 500 g | 50 |
| 3 | D | 980 g, 51% strength solution | 500 g | 50 |

General Preparation Example (Liquid Component on Finely Ground Limestone

A Grindomix GM 200 (Retsch GmbH) is charged with finely ground limestone (Omyacarb 20 BG from Omya GmbH). The liquid component is then added by pipette. Homogenization takes place at 5000 revolutions/minute for 5 minutes. The product is a readily free-flowing, finely ground limestone coated with the liquid component.

TABLE 3

| Example | Liquid component | Finely ground limestone |
|---|---|---|
| 4 (inventive) | 20 g (50% strength solution) from example 2 | 180 g |
| 5 (inventive) | 20 g (50% strength solution) from example 3 | 180 g |
| 6 (comparative) | 25 g (40% strength aqueous solution) copolymer A | 190 g |

APPLICATION EXAMPLES 285 g of self-leveling filling compound (see tables 4 and 5) and 285 g of cement mortar (see tables 4 and 6) are each admixed with 0.25 wt % of copolymer, based on the overall mass. For the comparative examples C1 and C2, the copolymer is weighed in as spray-dried polymer powder. For the comparative example C3, a finely ground, copolymer-coated limestone from example 6 is added to the self-leveling filling compound (copolymer is applied to the limestone in the form of an aqueous solution). For comparative example C4, the self-leveling filling compound is treated beforehand with a 40% strength solution of the copolymer and is then homogenized together with the finely ground limestone. After storage for a day, this mixture is subjected to the application test—that is, the development of the dispersing effect of the copolymer following addition of mixing water is tested. For application examples A1 and A2, finely ground limestones (15 g each from examples 2 and 3 respectively) coated with copolymer and with methyl polyethylene glycol 500 were mixed with the pulverulent composition. To assess the development of the dispersing effect of the copolymers following addition of mixing water, 300 g of the pulverulent composition thus treated are placed in a beaker and stirred with an axial stirrer at 500 revolutions per minute. Then mixing water is added and a measurement is made of the time after which the fresh mortar acquires, visually, a homogeneous consistency.

Binder Composition (Self-Leveling Filling Compound and Cement Mortar)

TABLE 4

| | Manufacturer | Self-leveling filling compound [parts by weight] | Cement mortar [parts by weight] |
|---|---|---|---|
| Portland cement (Milke CEM I 52.5N) | Heidelberg Cement AG | 30.00 | 46.00 |
| Calcium aluminate cement (Fondu Ciment) | Kerneos Inc | 10.00 | |
| Calcium sulfate binder CAB 30 | Lanxess AG | 6.00 | |
| Calcium carbonate (Omyacarb 6AL) | Omya GmbH | 10.00 | 10.00 |
| Calcium carbonate (Omyacarb 15AL) | Omya GmbH | 15.00 | 15.00 |
| Calcium carbonate (Omyacarb 130AL) | Omya GmbH | 26.38 | 26.6 |
| Lithium carbonate | Chemmetall GmbH | 0.10 | 0.10 |
| Defoamer (Vinapor DF 9010 F) | BASF Construction Polymers GmbH | 0.15 | 0.15 |
| Dispersible powder (Vinnapas 5023L) | Wacker AG | 2.00 | 2.00 |
| Tartaric acid | DU Chemie GmbH | 0.12 | |

The data in tables 5 and 6 show that the pulverulent compositions comprising finely ground, copolymer-coated limestone (A1-A4) ensure a much quicker development of the dispersing effect of the copolymers following addition of mixing water than when the pulverulent copolymers are added together with the mixing water (C1, C2, C5, C6) or when a finely ground limestone coated with an aqueous solution of a copolymer is added (C3), or when the aqueous polymer solution is premixed with the self-leveling filling compound before the mixing water is added (C4).

TABLE 5

| | C1 [g] | C2 [g] | C3 [g] | C4 [g] | A1 [g] | A2 [g] |
|---|---|---|---|---|---|---|
| Self-leveling filling compound (see table 4) | 285 | 285 | 285 | 285 | 285 | 285 |
| Copolymer A (spray-dried polymer powder) | 0.75 | | | | | |
| Copolymer B (spray-dried polymer powder) | | 0.75 | | | | |
| Example 4 | | | | | 15 | |
| Example 5 | | | | | | 15 |
| Example 6 | | | 15 | | | |
| Copolymer A (40% strength aqueous solution) | | | | 1.88 | | |
| Methyl polyethylene glycol 500 in mixing water | 0.75 | 0.75 | | | | |
| Omyacarb 20 BG | 13.5 | 13.5 | | 13.5 | | |
| Mixing water | 57 | 57 | 57 | 55.87 | 57 | 57 |
| Time until mixture homogeneous, in seconds | 10 | 10 | 10 | 12 | 6 | 5 |

TABLE 6

| | C5 [g] | C6 [g] | A3 [g] | A4 [g] |
|---|---|---|---|---|
| Cement mortar (see table 4) | 285 | 285 | 285 | 285 |
| Copolymer A (spray-dried polymer powder) | 0.75 | | | |
| Copolymer B (spray-dried polymer powder) | | 0.75 | | |
| Example 4 | | | 15 | |
| Example 5 | | | | 15 |
| Methyl polyethylene glycol 500 in mixing water | 0.75 | 0.75 | | |
| Omyacarb 20 BG | 13.5 | 13.5 | | |
| Mixing water | 57 | 57 | 57 | 57 |
| Time until mixture homogeneous, in seconds | 13 | 11 | 5 | 4 |

The invention claimed is:

1. A pulverulent composition, obtained by contacting a powder with 0.01 to 50 wt %, based on the overall mass of the composition, of a liquid component comprising at least one copolymer produced by a process comprising polymerizing a mixture of monomers comprising
   (I) at least one ethylenically unsaturated monomer which comprises at least one radical selected from the group consisting of carboxylic acid, carboxylic salt, carboxylic ester, carboxylic amide, carboxylic anhydride, and carboxylic imide and
   (II) at least one ethylenically unsaturated monomer having a polyalkylene oxide radical,
   the liquid component comprising at least 1 wt % of the at least one copolymer and at least 30 wt % of an organic solvent, and the powder which is contacted with the liquid component comprising no inorganic binder, wherein the powder is coated with the liquid component, the copolymer is present in solution in the liquid component, and
   wherein no drying of the composition is performed after the contacting of the powder with the liquid component.

2. The pulverulent composition according to claim 1, wherein the powder comprises at least one compound selected from the group consisting of silica sand, finely ground quartz, limestone, heavy spar, calcite, aragonite, vaterite, dolomite, talc, kaolin, mica, chalk, titanium dioxide, rutile, anatase, aluminum hydroxide, aluminum oxide, magnesium hydroxide and brucite.

3. The pulverulent composition according to claim 1, wherein the powder comprises at least one pigment selected from the group consisting of an organic pigment and an inorganic pigment.

4. The pulverulent composition according to claim 1, wherein the ethylenically unsaturated monomer (I) is represented by at least one of the following formulae (Ia), (Ib), and (Ic)

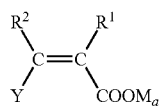
(Ia)

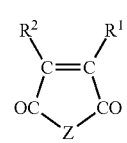
(Ib)

wherein $R^1$ and $R^2$ independently of one another are hydrogen or an aliphatic hydrocarbon radical having 1 to 20 C atoms, Y is H, —COOM$_a$, —CO—O(C$_q$H$_{2q}$O)$_r$—R$^3$ or —CO—NH—(C$_q$H$_{2q}$O)$_r$—R$^3$, M is hydrogen, a mono- or divalent metal cation, ammonium ion, or an organic amine radical, a is ½ or 1, $R^3$ is hydrogen, an aliphatic hydrocarbon radical having 1 to 20 C atoms, a cycloaliphatic hydrocarbon radical having 5 to 8 C atoms, or an optionally substituted aryl radical having 6 to 14 C atoms, q independently at each occurrence for each (C$_q$H$_{2q}$O) unit is identical or different and is 2, 3, or 4, r is 0 to 200, Z is O or NR$^3$,

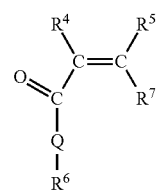
(Ic)

wherein $R^4$ and $R^5$ independently of one another are hydrogen or an aliphatic hydrocarbon radical having 1 to 20 C atoms, a cycloaliphatic hydrocarbon radical having 5 to 8 C atoms, or an optionally substituted aryl radical having 6 to 14 C atoms, Q is identical or different and is also represented by NH, $NR^3$, or O;

where $R^3$ possesses the definition stated above, $R^6$ is identical or different and is also represented by $(C_nH_{2n})$—$SO_3H$, $(C_nH_{2n})$—OH, $(C_nH_{2n})$—$PO_3H_2$, $(C_nH_{2n})$—$OPO_3H_2$, $(C_6H_4)$—$SO_3H$, $(C_6H_4)$—$PO_3H_2$, $(C_6H_4)$—$OPO_3H_2$, and $(C_nH_{2n})$—$NR^8{}_b$, and b is 2 or 3, wherein n is 0, 1, 2, 3 or 4, $R^7$ is H, —$COOM_a$, —CO—$O(C_qH_{2q}O)_r$—$R^3$, —CO—NH—$(C_qH_{2q}O)_r$—$R^3$, wherein $M_a$, $R^3$, q, and r are defined above, $R^8$ is hydrogen, an aliphatic hydrocarbon radical having 1 to 10 C atoms, a cycloaliphatic hydrocarbon radical having 5 to 8 C atoms, or an optionally substituted aryl radical having 6 to 14 C atoms.

5. The pulverulent composition according to claim 1, wherein the ethylenically unsaturated monomer (II) is represented by the following formula

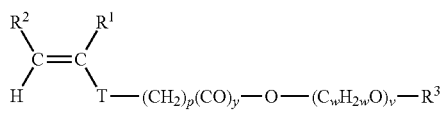
(II)

wherein p is an integer between 0 and 6, y is 0 or 1, v is an integer between 3 and 500, w independently at each occurrence for each $(C_wH_{2w}O)$ unit is identical or different and is an integer between 2 and 18, T is oxygen or a chemical bond, $R^1$ and $R^2$ independently of one another are hydrogen or an aliphatic hydrocarbon radical having 1 to 20 C atoms, $R^3$ is hydrogen, an aliphatic hydrocarbon radical having 1 to 20 C atoms, a cycloaliphatic hydrocarbon radical having 5 to 8 C atoms, or an optionally substituted aryl radical having 6 to 14 C atoms.

6. The pulverulent composition according to claim 1, wherein the fraction of the monomer (I) in the copolymer is 5 to 95 mol %.

7. The pulverulent composition according to claim 1, wherein the fraction of the monomer (II) in the copolymer is 1 to 89 mol %.

8. The pulverulent composition according to claim 1, wherein the organic solvent is selected from the group consisting of ethyl acetate, n-butyl acetate, 1-methoxy-2-propyl acetate, ethanol, isopropanol, n-butanol, 2-ethylhexanol, 1-methoxy-2-propanol, ethylene glycol, propylene glycol, acetone, butanone, pentanone, hexanone, methyl ethyl ketone, ethyl acetate, butyl acetate, amyl acetate, tetrahydrofuran, diethyl ether, toluene, xylene, higher-boiling alkylbenzenes, a polyethylene glycol ether, a polypropylene glycol ether, a random ethylene oxide/propylene oxide copolymers having an average molar mass of 200 to 2000 g/mol, monoethylene glycol, diethylene glycol, triethylene glycol, monopropylene glycol, dipropylene glycol, tripropylene glycol, methyl, ethyl, propyl, butyl, or higher alkyl polyalkylene glycol ethers having 1, 2, 3, or more ethylene glycol and/or propylene glycol units, a glycerol ethoxylate having a molecular weight of 200 to 20,000 g/mol, pentaerythritol alkoxylates, ethylene carbonate, propylene carbonate, glycerol carbonate, glycerol formal and 2,3-O-isopropylideneglycerol.

9. The pulverulent composition according to claim 1, wherein the monomer (I) or (II) comprises a random ethylene oxide/propylene oxide copolymer having a molecular weight of 160 to 10,000 g/mol.

10. The pulverulent composition according to claim 1, wherein the powder comprises silica sand.

11. The pulverulent composition according to claim 1, wherein the powder comprises finely ground quartz.

12. The pulverulent composition according to claim 1, wherein the powder comprises limestone.

13. The pulverulent composition according to claim 12, wherein the organic solvent is methyl polyethylene glycol.

14. The pulverulent composition according to claim 1, wherein the liquid component comprises water.

15. A binder composition comprising a pulverulent composition according to claim 1 and an inorganic binder.

16. The binder composition according to claim 15, wherein the inorganic binder is at least one member selected from the group consisting of cement based on Portland cement, white cement, calcium aluminate cement, calcium sulfoaluminate cement, calcium sulfate n-hydrate, and latent hydraulic and pozzolanic binder.

17. A method for producing a binder composition comprising mixing a pulverulent composition according to claim 1 with an inorganic binder.

\* \* \* \* \*

UNITED STATES PATENT AND TRADEMARK OFFICE
CERTIFICATE OF CORRECTION

PATENT NO. : 10,266,700 B2
APPLICATION NO. : 14/762274
DATED : April 23, 2019
INVENTOR(S) : Manfred Bichler et al.

Page 1 of 1

It is certified that error appears in the above-identified patent and that said Letters Patent is hereby corrected as shown below:

In the Specification

Column 15, Lines 16-17, "vinyoxybutyl" should read -- vinyloxybutyl --, therefor.

Column 15, Line 58, "(Liquid" should read -- Liquid --, therefor.

Column 16, Line 60, "Chemmetall" should read -- Chemetall --, therefor.

Signed and Sealed this
Fourteenth Day of April, 2020

Andrei Iancu
*Director of the United States Patent and Trademark Office*